United States Patent

[11] 3,550,783

[72] Inventor Daniel E. Holloway
 Torrance, Calif.
[21] Appl. No. 752,447
[22] Filed July 30, 1968
[45] Patented Dec. 29, 1970
[73] Assignee The Carborundum Company
 Niagara Falls, N.Y.
 a corporation of Delaware

[54] LIQUID TRANSFER MEANS FOR SETTLING TANKS
 4 Claims, 8 Drawing Figs.
[52] U.S. Cl............................................. 210/522,
 210/540
[51] Int. Cl............................................. B01d 21/24
[50] Field of Search............................................ 210/519-
 —522, 538, 540

[56] References Cited
UNITED STATES PATENTS

| | | | |
|---|---|---|---|
| 828,515 | 8/1906 | Schmidt...................... | 210/519 |
| 897,161 | 8/1908 | Senter......................... | 210/540X |
| 1,861,156 | 5/1932 | Fahr et al.................... | 210/540X |
| 2,671,562 | 3/1954 | Bingman...................... | 210/538X |
| 2,999,597 | 9/1961 | Harms......................... | 210/521X |
| 3,278,027 | 10/1966 | Johnson et al............... | 210/538X |

*Primary Examiner*—John Adee
*Attorney*—Karl W. Brownell

ABSTRACT: Transfer means for causing a high quantity low-velocity flow of liquid from a settling tank in liquid clarification installations, including a transfer or discharge assembly embodying increased linear feet of overflow edge.

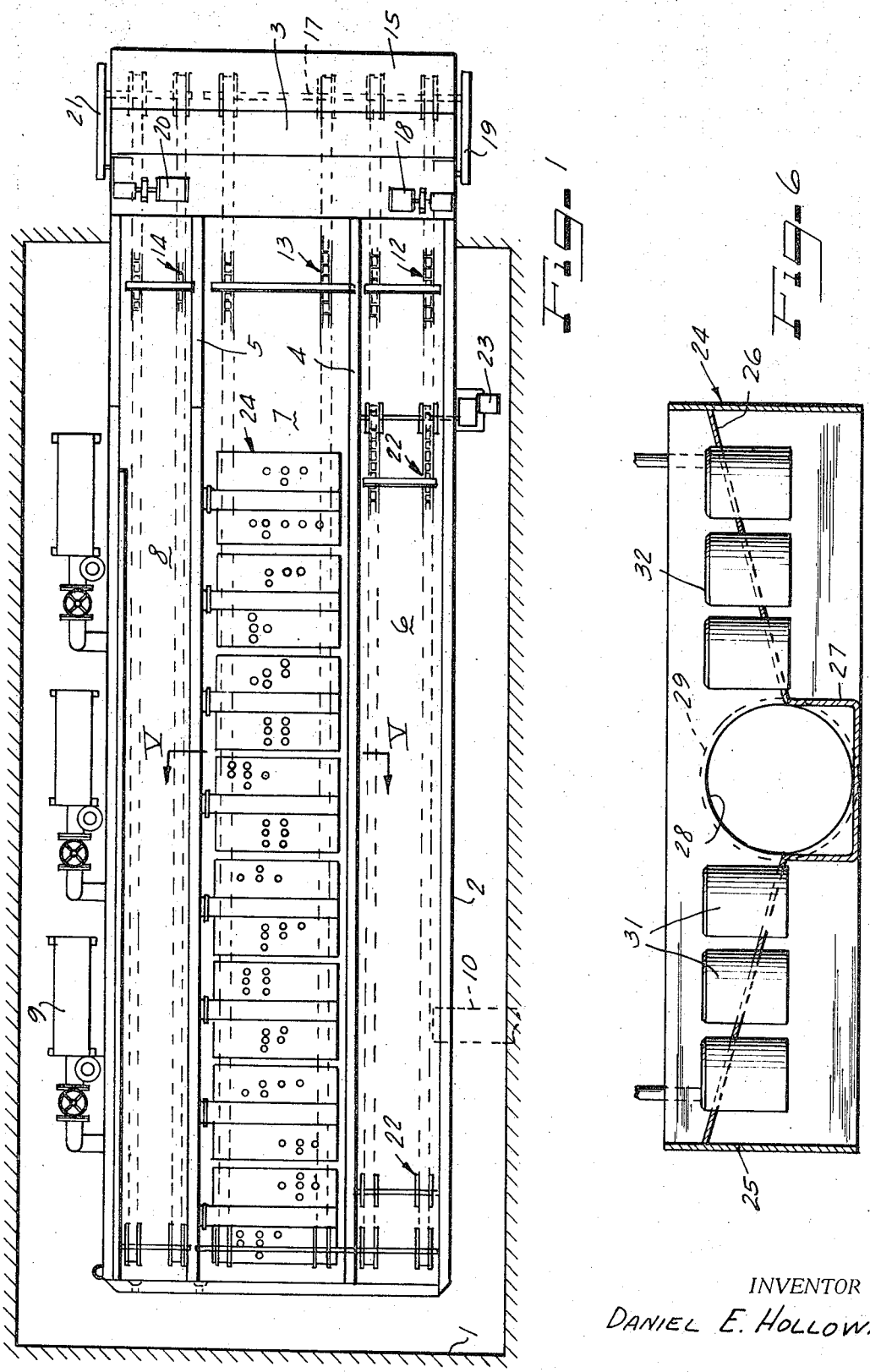

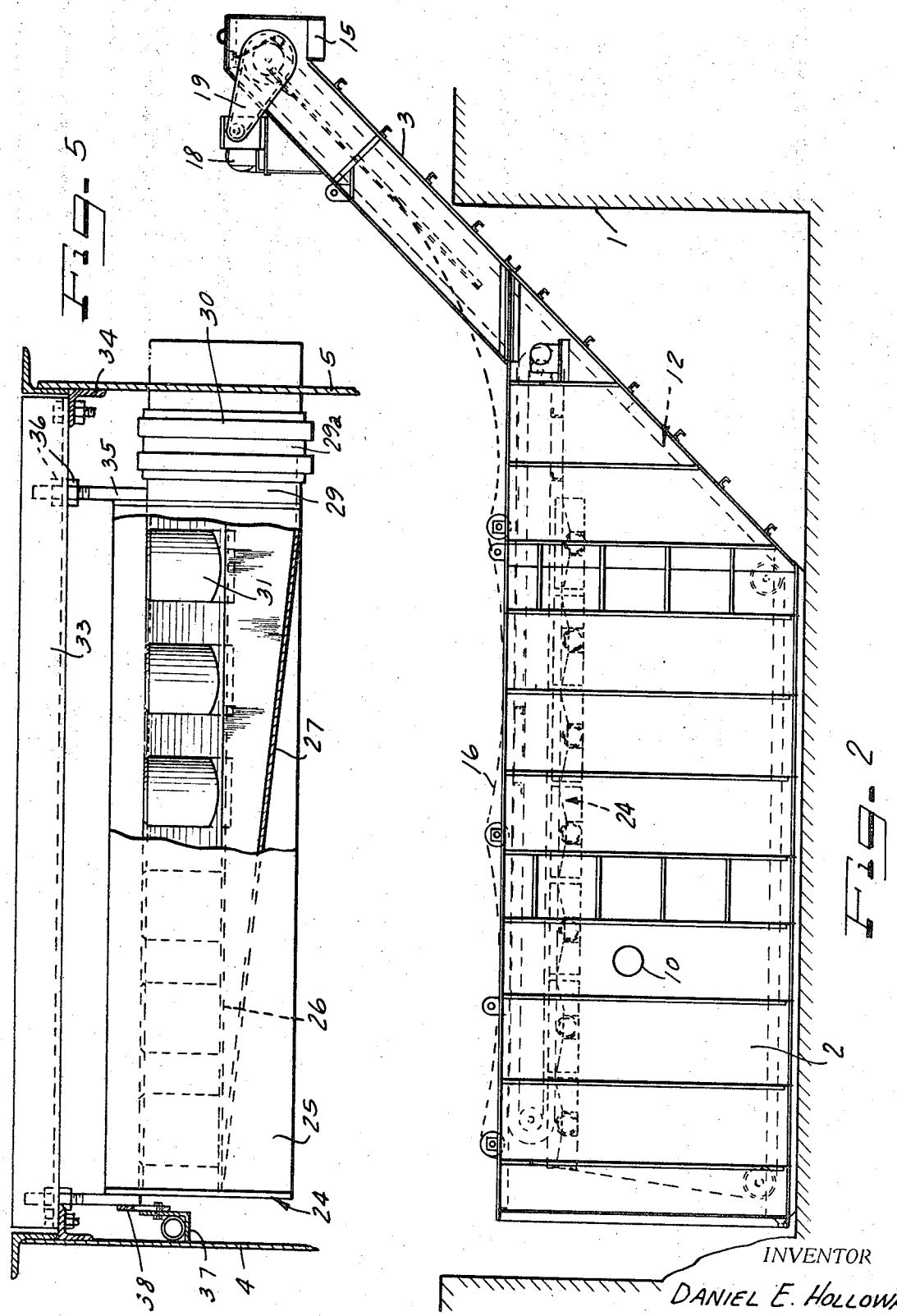

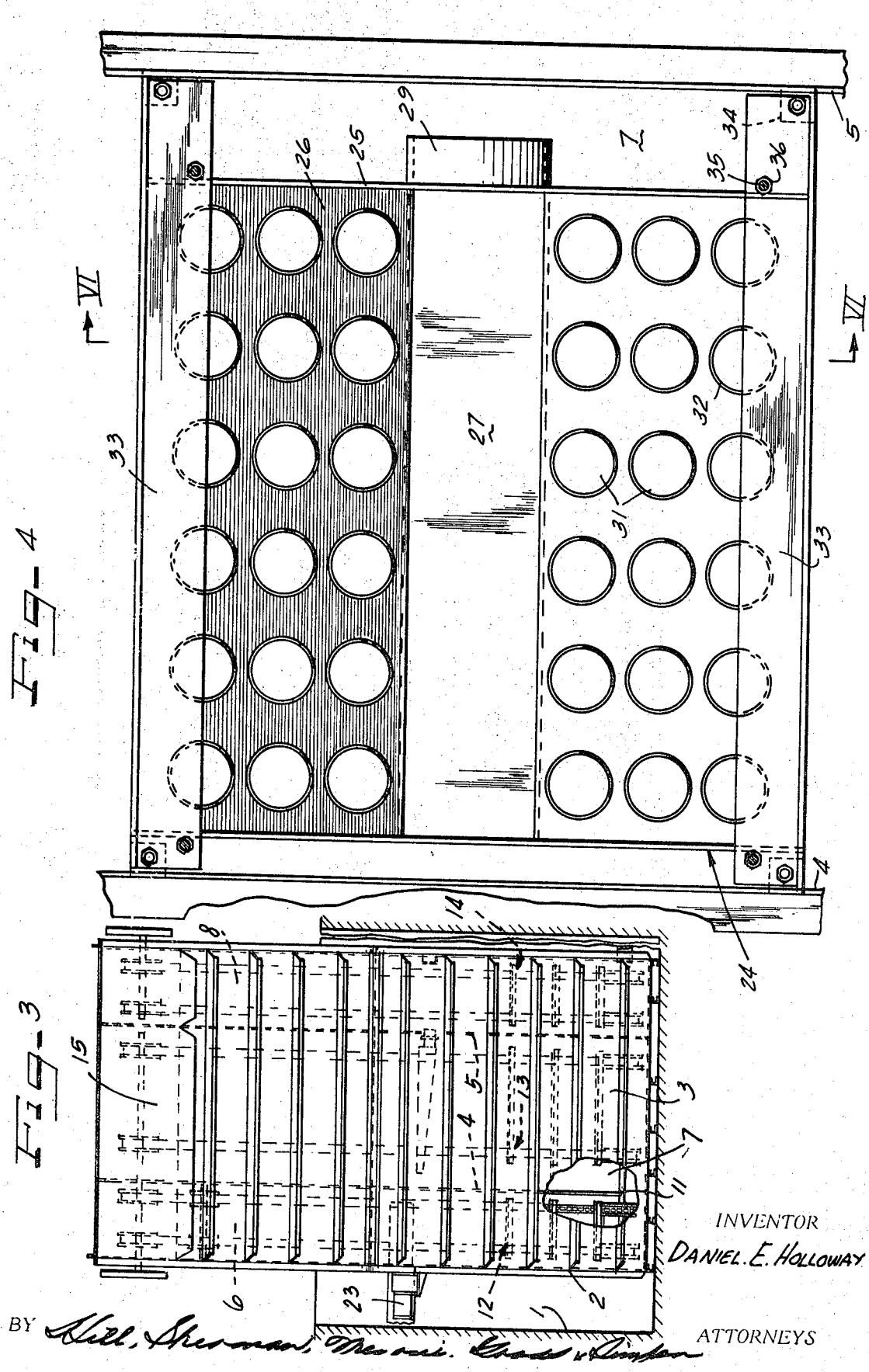

LIQUID TRANSFER MEANS FOR SETTLING TANKS

BACKGROUND OF THE INVENTION

1. Field of the Invention

This invention or discovery pertains to the art of liquid clarification, and more particularly to transfer or discharge means for the movement of liquid from a settling tank, wherein gravitation separation of contaminants from the liquid may occur, a high quantity of liquid being discharged at low velocity; the instant invention utilizing a multiplicity of overflow tubes discharging into a container, from which a pipe connection provides an exit for the discharged liquid. Flight conveyors are utilized to scrape sediment or other contaminants from the bottom of the tank or tanks up a ramp from which the contaminants may be discharged into a waste collector. In some instances a form of skimming conveyor is also utilized which may transfer floating contaminants or debris into the path of the bottom scraping conveyor. Such liquid clarification systems are highly desirable for the clarification of cutting and grinding oils, water base coolants, mineral oils, and various industrial coolants utilized to keep the tools from overheating in cutting and grinding mechanisms, although the invention may be used for clarifying many and various contaminated liquids as will be apparent to one skilled in the art.

2. Description of the Prior Art

Heretofore, many and various types and shapes of settling tanks have been used for many and various purposes including the separation of contaminants from a liquid, sewage treatment, separation of ores, removing coke from coal, etc. In these tanks, some contaminants may float on the liquid, while the heavier contaminants will settle to the bottom of the liquid and the liquid in a tank moves very slowly to permit this. Great difficulty has been experienced in transferring a large quantity of clean liquid from a tank at low velocity to prevent agitation sufficient to stir up the settled contaminants. The liquid must leave the settling tank at or near the top thereof and in the past some tanks have had overflow edges and efforts have been made to increase the effective length of overflow edges to acquire the necessary flow rate and avoid the use of extremely large and costly tanks. In an effort to accomplish this in the past, parallel troughlike weirs have been utilized over the edges of which clean liquid could flow and be carried through the troughs to a collecting tank or manifold. Such efforts were not as effective as is desired since the lineal feet of overflow edge was unattainable to the extent desired and it was extremely difficult with a number of overflow edges to acquire leveling of the edges because of the unevenness of the floor upon which the tank rested and in many instances ultimate grinding of the overflow edges was essential after assembly or installation. Economy, efficient cleansing, and space saving for any given rate of flow was not therefore obtained to the desired extent.

SUMMARY OF THE INVENTION

The instant invention provides transfer means for removing a large quantity of fluid at low velocity from a settling tank, which means are in the form of tube and box assemblies disposed across the tank with the sides of the box extending both below and above the liquid level in the tank which is controlled by the tubes. The tubes are mounted in the bottom of the box with their upper edges all at the same level, and the box bottom is inclined toward a troughlike central portion which also is inclined to terminate in an outlet fitting connectable to an outlet pipe mounted in the wall of the tank. Liquid rising in the tank will pass through the tubes and discharge into the respective boxes and thence exit through the pipes in the wall of the tank. Such tube and box assemblies provide a maximum lineal feet of overflow edge in a minimum space, allowing the use of smaller and less costly tanks for a given flow rate, and with lower flow velocities over the tube edges better clarity of the liquid is obtained. The boxes may be suspended from cross beams mounted in the tank and then leveling of all of the overflow edges is easily accomplished and there is no need for any grinding of the overflow edges to provide leveling necessitated by uneven flooring. The tube and box arrangement permits modular design resulting in more economical production, easy removal of individual assemblies for any maintenance, and because of the modular design, proper combinations of relatively few standardized sizes permits simple sizing for flow requirements. Accordingly, the instant invention overcomes and effectively solves the problems previously existent in this art by providing more economy, more space saving, higher liquid clarifying efficiency and greater flow capacity in comparison with tank sizes heretofore necessary.

BRIEF DESCRIPTION OF THE DRAWINGS

FIG. 1 is a plan view of a settling tank assembly including transfer means embodying principles of the instant invention;

FIG. 2 is a side elevational view of the structure shown in FIG. 1;

FIG. 3 is an elevational view of the assembly taken from the right hand side of FIG. 2;

FIG. 4 is a fragmentary enlarged plan view of one of the liquid transfer assemblies seen in FIG. 1;

FIG. 5 is a fragmentary enlarged transverse sectional view taken substantially as indicated by the line V-V of FIG. 1;

FIG. 6 is a transverse vertical sectional view taken substantially as indicated by the line VI-VI of FIG. 4, looking in the direction of the arrows, and showing the tubes in elevation.

DESCRIPTION OF THE PREFERRED EMBODIMENT

Settling tank assemblies are made in various sizes and shapes, depending upon the amount of liquid that must be clarified liquid at the point of usage. As stated above, settling tanks may be used for many and various purposes. By way of example and not by way of limitation, a settling tank of relatively large size and of a type highly desirable for the clarification of industrial coolants used on the tools of the cutting and grinding machines is herein presented. Settling tank assemblies, especially of the larger sizes, are frequently installed in a floor pit 1 diagrammatically shown in the drawings.

In the illustrated embodiment, an overall tank 2 is shown which is generally rectangular in shape, but one end of which is closed by an upwardly inclined ramp 3 which extends outside the pit 1 as seen clearly in FIG. 2. This overall tank 2 is interiorly divided by vertical partitions 4 and 5 spaced so as to define with the outer tank walls an inlet tank 6, a settling tank 7, and a clean tank 8 from which clarified liquid may be removed and delivered back to the point of usage by one or more pumps 9 as indicated in FIG. 1. Contaminated liquid may be delivered to the inlet tank 6 through the open top thereof, or through the sidewall of the overall tank as shown at 10, or in any other suitable or convenient manner. This contaminated liquid finds its way into the settling tank adjacent the bottom thereof since the conjoint wall 4 between these tanks terminates at the point 11, FIG. 3, leaving an open space above the bottom of the inlet tank and the bottom of the settling tank establishing communication therebetween. In smaller installations, the inlet tank might be dispensed with and the contaminated liquid may be fed directly into the settling tank.

In the illustrated embodiment, each of the tanks 6, 7 and 8 is provided with a bottom scraping flight conveyor, these being indicated by numerals 12, 13 and 14 respectively. Each conveyor picks up the heavier contaminants that has settled to the bottom of the respective tank, and carries the contaminants up the aforesaid ramp 3 to a discharge hopper 15 from which the contaminants may drop into any suitable form of waste receptacle. Each of these flight conveyors comprises a pair of endless chains between which outwardly projecting flights are connected in spaced relationship. The chains pass over sprocket wheels at the respective ends thereof and return to the bottom preferably by passing over the top of a tank following the path indicated in FIG. 2 by the dotted line 16. The conveyor of the general construction of the conveyors utilized in similar fashion shown in U.S. Letters Pat. No. 2,151,578 of Mar. 21, 1939, and the flights may or may not have perforations therein as may be desired under particular circumstances. The conveyors 12 and 13 may be conveniently mounted on the same shafting as indicated at 17 and are driven simultaneously by a motor 18 acting through a transmission 19 to the shaft 17, although they can be separately driven, if desired. The conveyor 14 in the clean tank 8 is driven in similar manner by a motor 20 acting through a transmission 21 so that this conveyor may be separately operated when needed. The inlet tank may also be provided with a skimming conveyor, generally indicated by numeral 22 since most of the floating debris will be found in this tank. This conveyor 22 moves through the liquid adjacent the surface thereof and guides floating contaminants into the path of the flights on the conveyor 12 for delivery up the ramp to the discharge hopper. The conveyor 22 which is like the others, except for its shorter and different path of travel, is driven by a motor 23 mounted on the outside wall of the inlet tank.

One of the most important steps in settling tank or gravity clarification liquids is to flow clarified liquid gently out of the top of the settling tank in a manner to provide an ample amount of clarified liquid and eliminate agitation of the liquid in the setting tank as much as possible to prevent redistribution of the settled contaminants. The most proven method of accomplishing this has been to permit the liquid in the settling tank to slowly rise and gently flow over a discharge edge. It is therefore desirable to provide a maximum of discharge edging, which results in a greater quantity of overflow clarified liquid, a gentler flow of the liquid and the maintenance of the tank size to a minimum.

This desideratum has been accomplished in the present invention to a greater extent than has heretofore been possible. For example, with the disclosed arrangement, the settling tank 7 having a base length of approximately 33′, a width of approximately 4′—6″, and a height slightly exceeding 9′ has a capacity of 1800 gallons per minute of clarified liquid.

In order to acquire extra linear feet of discharge edging for overflow from the tank 7, a plurality of like transfer or discharge assemblies, generally indicated by numeral 24, is provided along the upper portion of the tank 7. Each of these assemblies, as best seen in FIGS. 4, 5 and 6, comprises a boxlike receiver 25 having a bottom 26 which slopes from opposite sides of the box downwardly toward a centrally disposed trough 27, preferably integral with the bottom 26. As seen in FIG. 5, the bottom of the trough slopes downwardly from one end of the box toward the other. As best seen in FIG. 6, the end wall of the box 25 is provided with an opening 28 at the lower end of the trough bottom, and a pipe fitting 29 is welded or equivalently secured to the outside of the tank wall around that opening. In the illustrated instance the fitting 29 is connected by a flexible hose 29a to a complemental fitting and short pipe length indicated at 30 in FIG. 5 which extends through the wall 5 to discharge into the clean tank 8, although it will be understood that the fitting 29 could be associated with a delivery pipe in certain installations depending upon the type of contaminants being removed. The flexible connection permits easy leveling of the transfer assembly.

Through suitable apertures in the opposed sloping portions of the box bottom 26 a plurality of tubes 31 extend and are welded or equivalently secured to the box bottom. The tubes are preferably symmetrically arranged and are spaced apart so that liquid may flow between them. The tops of all tubes are maintained at the same level, and therefore, as best seen in FIG. 6, the outermost tubes project farther through the box bottom than the inner tubes. Since grinding, as will later appear, is not necessary to compensate for uneven flooring, the tubes are preferably beveled at the top as indicated at 32 to provide a knife edge over which liquid rising in the tank 7 and through the tubes may flow, knife edges being more efficient because of less area in contact with the liquid and hence less surface tension.

Each assembly 24 is easily mounted in the upper portion of the tank 7 by suspending each assembly from a pair of opposed crossmembers 33–33 bolted at each end to lug 34 welded to the inside wall of the tank. Welded or equivalently secured to the assembly adjacent each corner thereof is an upstanding bolt 35 which extends through a suitable aperture in the respective crossbar 33 and connected to the crossbar by a double nut arrangement 36 by means of which it is easy to adjust the individual effective height or length of each bolt. With this arrangement it is a simple expedient, without any grinding of the tubes whatever, to adjust the assemblies 24 so that the tops of the tubes of all the assemblies are at the same level, and such adjustment or leveling may be done rapidly and economically. It is preferable to dispose the tube and box assemblies over the deeper portion of the tank 7 and not over the ramp portion of the tank since there is more likelihood of agitation by the conveyor as the depth of liquid becomes less due to the rise of the ramp.

As indicated in the left portion of FIG. 5, a trough 37 on which an adjustable weir 38 is mounted may be disposed in any tank desired, for the purpose of removing tramp oil, particularly when the liquid being clarified is a coolant used with cutting and grinding machines.

In the operation of the illustrated clarification installation, contaminated liquid enters the inlet tank 6 from which it passes into the bottom of the settling tank 7 beneath the lower edge of the partition 4. The liquid being clarified slowly rises within the tank 7 while the contaminants settle to the bottom of the tank, and are removed by the conveyor 13. Some contaminants will settle to the bottom of the inlet tank and the clean oil tank 8, and these will be removed in similar manner by the conveyors 12 and 14 and the contaminants from all the conveyors are discharged through the hopper 15.

The liquid rising in the tank 7 will pass upwardly through the tubes 31 and flow over the knife edges of the tubes into the respective box 25 in highly clarified condition. This overflow of liquid into the boxes is high in quantity but at an extremely low velocity, owing to the fact that the discharge edging provided by the tubes has a total length greatly exceeding the sum of the lengths of the two tank sides and vertical wall. This provides greater clarification efficiency and permits the use of smaller tank size for a given flow rate. Within the boxes the liquid leaving the tank 7 may be highly agitated, but the liquid is then out of the tank 7, and the walls of the boxes extending above the upper ends of the tubes function as baffles and confine such agitation of the liquid to the boxes, and such agitation with the boxes creates a flushing action that keeps the inside surfaces of the boxes clean and free-flowing. In the illustrated instance the liquid leaving the boxes through the respective outlet ports 28 enters the clean tank 8 from which the clarified liquid may be pumped to the point of usage.

It will be noted that the modular design of the transfer assemblies 24 permits easy removal of one or more of them at any time for any maintenance which may be required, affords extremely easy leveling of the overflow edges so that each tube delivers the same capacity as any other tube, and proper combinations of relatively few standardized sizes of transfer assemblies permits simple sizing for various floor requirements, resulting in increased economy in production, installation and maintenance.

It will be understood that modifications and variations may be effected without departing from the scope of the novel concepts of the present invention.

I claim:

1. In a liquid clarification system comprising a settling tank wherein liquid introduced into the tank slowly rises while contaminants contained in the liquid settle to the bottom to be removed by mechanical means, and wherein the improvement resides in the transfer means for discharging the clarified liquid from the settling tank, said transfer means comprising:

a boxlike receiver supported and suspended within said tank so that the sidewalls thereof extend above and below the top level of the liquid contained in said tank when in operating use;

said receiver having a bottom and an outlet for conveying liquid out of said receiver; and a plurality of open ended tubes within said receiver extending through the bottom of said receiver and up through which liquid rising in the settling tank flows to overflow at the top edges of the tubes into said receiver to be released through the outlet thereof, the top edges of said tubes being in the same horizontal plane lower than the horizontal planes of the top of the top peripheral edge of said receiver.

2. The clarification system of claim 1 including:

spaced crossbars at the top of said settling tank; and adjustable means suspending said receiver and the tubes therein from said crossbars, whereby leveling of the tube tops is facilitated.

3. The clarification system of claim 1 wherein the bottom of said receiver slopes in general downwardly toward said outlet.

4. The clarification system of claim 1 including:

a fitting at the outlet of said receiver;

a fitting extending through a wall of the tank; and a flexible tube connecting said fittings permitting ready leveling of the tube tops.